May 20, 1958  J. S. PILCH  2,835,396
RIGID MOUNTING FOR EQUIPMENT ON TRACTOR

Filed Nov. 16, 1955  3 Sheets-Sheet 1

INVENTOR.
JOHN S. PILCH
BY
Raymond A. Paquin
ATTORNEY.

May 20, 1958   J. S. PILCH   2,835,396
RIGID MOUNTING FOR EQUIPMENT ON TRACTOR
Filed Nov. 16, 1955   3 Sheets-Sheet 2

INVENTOR.
JOHN S. PILCH
BY
ATTORNEY.

May 20, 1958  J. S. PILCH  2,835,396
RIGID MOUNTING FOR EQUIPMENT ON TRACTOR
Filed Nov. 16, 1955  3 Sheets-Sheet 3
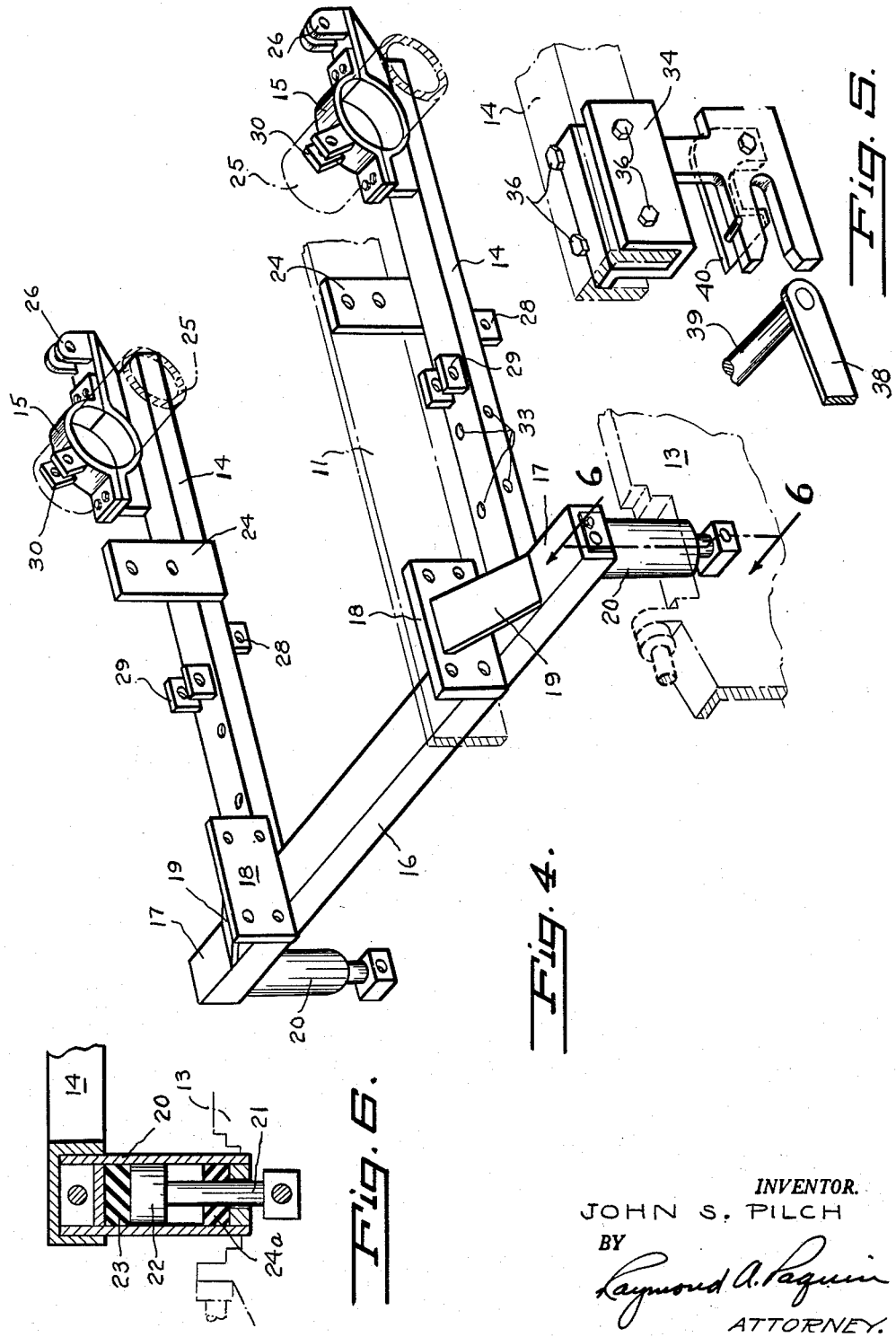
INVENTOR.
JOHN S. PILCH
BY
ATTORNEY.

United States Patent Office 2,835,396
Patented May 20, 1958

2,835,396

RIGID MOUNTING FOR EQUIPMENT ON TRACTOR

John S. Pilch, Ware, Mass.

Application November 16, 1955, Serial No. 547,064

8 Claims. (Cl. 214—131)

This invention relates to a new and improved equipment mounting sub-frame assembly for tractors.

An object of the invention is to provide an equipment mounting sub-frame assembly for tractors which can adapt or mount any kind of equipment by simple attaching means.

Another object is to provide a device of the type set forth which is adapted to structurally reinforce the tractor by tying the motor frame to the axle housing for additional strength and which allows true vertical movement of the tracks while absorbing shocks.

Other objects and advantages will be apparent from the following description taken in connection with the accompanying drawings. In the drawings and specification, the preferred form of the invention has been given by way of illustration only.

Tractors were originally designed for drawbar work and not for carrying equipment such as loaders, dozers and adjustable platforms for drawn apparatus. With the development of such tractor borne apparatus, there is a need for mounting apparatus on the tractor for carrying material which is often of greater weight than the tractor and consequently such usage of the tractor often results in damage to or ruin of the tractor.

It is the principal object of the present invention to provide a new and improved equipment mounting sub-frame assembly for tractors which adapts the tractor for such tractor borne apparatus which adds rigidity and strength to the whole tractor as well as a ready mounting for tractor borne equipment singly or any variation thereof, simply and easily, without danger of harm or damage to the tractor and which eliminates any warpage or twisting of the tractor frame.

Referring to the drawings:

Fig. 4 is a perspective view of the equipment mounting sub-frame assembly of the invention and illustrating the method of connecting the assembly to a tractor;

Fig. 5 is a fragmentary perspective view illustrating the arrangement for connecting a dozer to the tractor; and Fig. 6 is a sectional view taken on line 6—6 of Fig. 4, looking in the direction of the arrows.

Figure 1:
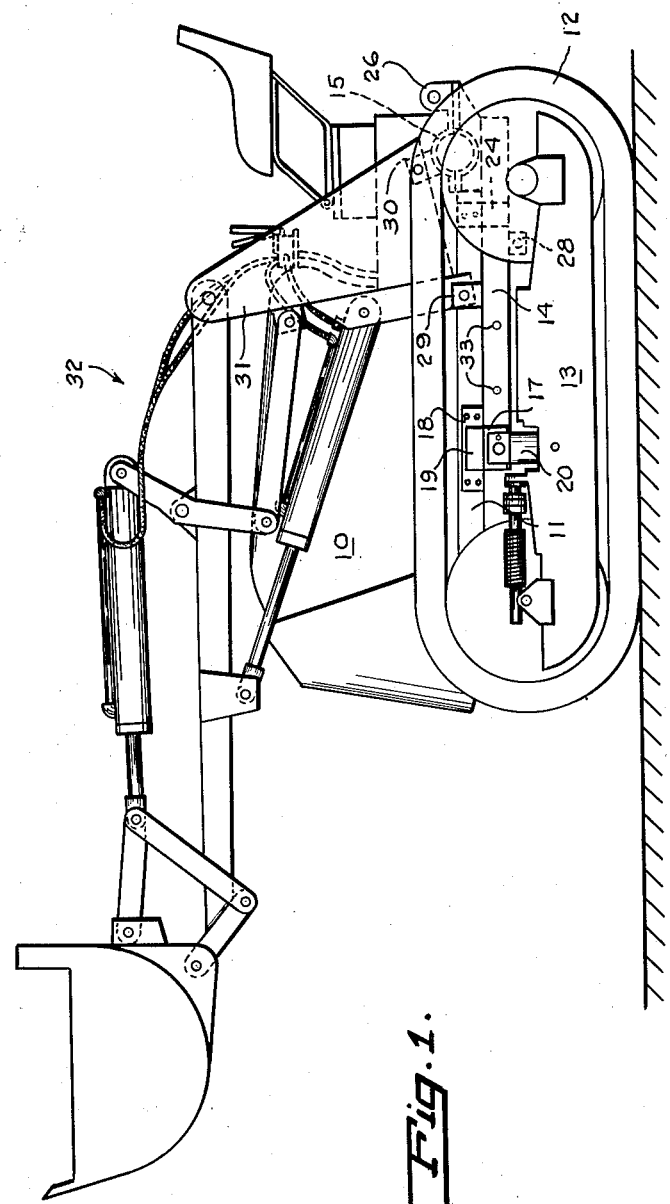
Fig. 1 is a side view showing a tractor having a loader mounted thereon and showing the invention.
Figure 2:
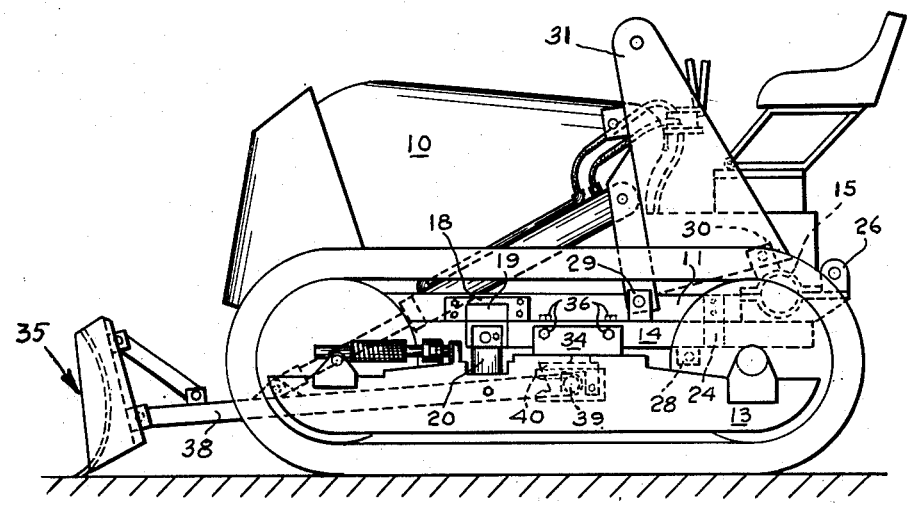
Fig. 2 is a side view generally similar to Fig. 1 of a tractor having a dozer mounted thereon.

Referring more particularly to the drawings wherein similar reference characters designate corresponding parts throughout, the arrangement shown comprises a track type tractor having the usual engine 10, frame 11, tracks 12 and track frames 13.

In order to mount the tractor borne equipment on the tractor, it is provided with the equipment mounting sub-frame assembly comprising the pair of spaced parallel supports 14, adapted to extend longitudinally of the tractor in parallel relation with the tractor frame 11.

These supports 14 are each provided adjacent their rear ends with securing means or clamps 15 for securing the supports 14 to the tractor axle 25.

Adjacent the forward end of the spaced supports 14 is provided the lateral connecting member 16 which is connected to supports 14 by welding or other suitable means. Connecting member 16 has the end portions 17 extending beyond the connection of connecting member 16 and supports 14 and overlying the upper sides of track frames 13 on the opposite sides of the tractor.

The connecting member 16 is also provided with the oppositely disposed connecting members 18 which are adapted to be connected to the opposite supports of the tractor frame preferably by bolts or rivets although welding or other suitable rigid connecting means may be employed. The struts 19 may be provided for additional rigidity and strength.

The extension portions 17 on connecting member 16 are each connected to the upper side of their respective track frames 13 by shock absorbing means comprising tubular or cylinder members 20 secured to the ends of portions 17 and adapted to receive members 21 which are connected to track frames 13 and extend into respective tubular members 20 and carry piston portion 22 positioned between cushions 23 and 24a of rubber or the like.

Between axle clamps 15 and connecting member 16, the supports 14 are each provided with a support 24 which is secured to its respective support 14 by welding or other suitable means and extends upwardly therefrom and is adapted to be secured to a respective tractor frame member 11 by bolts or other suitable means.

Figure 3:
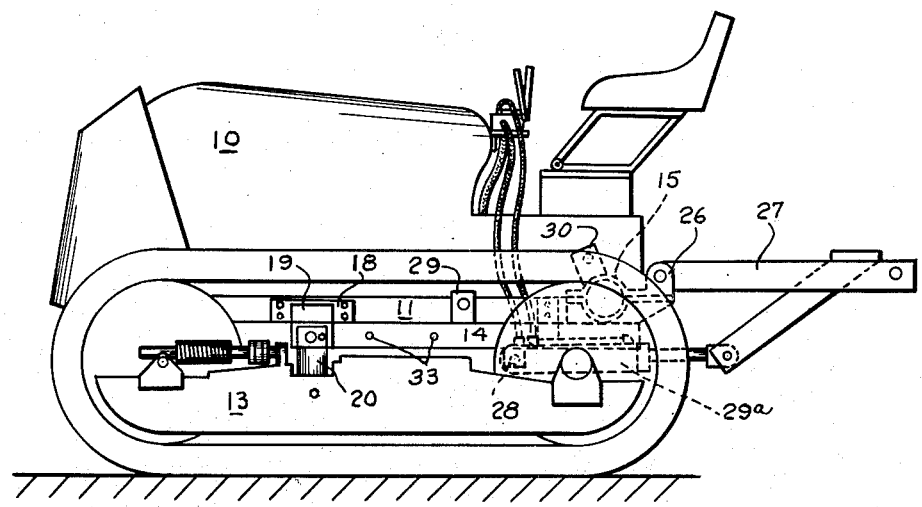
Fig. 3 is a side view generally similar to Figs. 1 and 2, showing an adjustable platform carried by the tractor.

At the rear ends of the supports 14 behind axle clamps 15, each of said supports 14 is provided with the pivot connection or ears 26 whereby an adjustable platform 27 as shown in Fig. 3 may be operatively connected to the tractor and the supports 14 are each provided with a depending lug or pivot connection 28 for operatively connecting the platform actuating cylinders 29a to the tractor. It will thus be seen that the platform and its cylinders can be connected to or disconnected from the tractor by means of the four lugs or pivotal connections 26 and 28.

Each of the supports 14 is provided with an upwardly extending lug or pivot connection 29 and with lugs or pivot connections 30 on axle clamps 15 whereby loader supports 31 may be easily and quickly attached to or disconnected from the tractor, thus allowing the loader 32, as shown in Fig. 1, and its supports to be easily and quickly attached to or detached from the tractor as a unit.

It is pointed out that the spaced supports 14 and connecting member 16 may be of flat stock or channelled, as shown in Fig. 5, or of other desired shape.

As will be seen from Fig. 5, with the oppositely disposed openings 33 in the supports 14, the quick detachable hitch 34 for the dozer 35 may be quickly and easily attached to or detached from the tractor by means of bolts 36. If desired the hitch 34 could be left attached to the supports 14 and then the dozer 35 can be attached to or detached from the tractor by means of the detachable connections between the dozer arms 38 and hitch members 34 which comprises the pins 39 on dozer arms 38 and pivotable dogs 40 on hitch members 34.

It will be seen from the foregoing that with the present invention the tractor will be adapted for tractor mounted accessories and that means is provided for adding rigidity and strength to the whole tractor and for readily mounting equipment singly or in any variation without danger of harm to the tractor and simply and easily.

The operation of the invention is believed apparent

I claim:

1. In an equipment mounting sub-frame assembly for connection to the frame of a crawler tractor, a pair of spaced parallel supports adapted to be positioned for connection to the tractor frame, a rigid connecting member rigidly connected to said supports, first connecting means carried by each of said supports for connection to the tractor axle and second connecting means spaced from said first connecting means for rigidly connecting said assembly to the tractor frame, said connecting member having end portions extending beyond said parallel supports and overlying the tractor tracks.

2. In an equipment mounting sub-frame assembly for connection to the frame of a crawler tractor, a pair of spaced parallel supports adapted to be positioned for connection to the tractor frame, a rigid connecting member rigidly connected to said supports, first connecting means carried by each of said supports for connection to the tractor axle and second connecting means spaced from said first connecting means for rigidly connecting said assembly to the tractor frame, said connecting member having end portions extending outwardly beyond said parallel supports and having their end portions overlying the tractor tracks and shock absorbing means connecting said end portions of said connecting member with said tractor tracks.

3. In an equipment mounting sub-frame assembly for connection to the frame of a crawler tractor, a pair of spaced parallel supports adapted to be positioned for connection to the tractor frame, a rigid connecting member rigidly connected to said supports, first connecting means carried by each of said supports for connection to the tractor axle and second rigid connecting means spaced from said first connecting means for rigidly connecting said assembly to the tractor frame and third connecting means on each of said parallel supports for rigidly connecting said supports to said tractor frame and equipment attaching means carried by said spaced supports.

4. In an equipment mounting sub-frame assembly for connection to the frame of a crawler tractor, a pair of spaced parallel supports adapted to be positioned for connection to the tractor frame, a rigid connecting member rigidly connected to said supports, first connecting means carried by each of said supports for connection to the tractor axle and second connecting means spaced from said first connecting means for rigidly connecting said assembly to the tractor frame and third connecting means on each of said parallel supports for rigidly connecting said supports to said tractor frame, shock absorbing means connecting said connecting member with said tractor track frame and equipment attaching means carried by said spaced supports.

5. In an equipment mounting sub-frame assembly for connection to the frame of a crawler tractor, a pair of spaced supports adapted to extend longitudinally of the tractor means adjacent one end of each of said supports for connecting said supports to the tractor axles, a lateral rigid connecting member rigidly connected to said supports at points spaced from said axle connecting means, said lateral connecting member having its end portions extending outwardly beyond said spaced supports and overlying the tractor tracks, and means for rigidly connecting said connecting member to the tractor frame and shock absorbing means connecting said outwardly extending end portions of said connecting member with said tractor track frame.

6. In an equipment mounting sub-frame assembly for connection to the frame of a crawler tractor, a pair of spaced supports adapted to extend longitudinally of the tractor frame, means adjacent one end of each of said supports for connecting said supports to the tractor axles, a lateral rigid connecting member rigidly connected to said supports adjacent the ends of said supports opposite said axle connecting means, said lateral connecting member having its end portions extending outwardly beyond said spaced supports and overlying the tractor track frame, means for rigidly connecting said connecting member to the tractor frame, and equipment attaching means carried by said spaced supports.

7. In an equipment mounting sub-frame assembly for connection to the frame of a crawler tractor, a pair of spaced supports adapted to extend longitudinally of the tractor frame, means adjacent one end of each of said supports for connecting said supports to the tractor axles, a lateral rigid connecting member rigidly connected to said supports adjacent the ends of said supports opposite said axle connecting means, said lateral connecting member having its end portions extending outwardly beyond said spaced supports and overlying the tractor track frame, means for rigidly connecting said connecting member to the tractor frame, shock absorbing means connecting said outwardly extending end portions of said connecting member with said tractor track frame and equipment attaching means carried by said spaced supports.

8. In an equipment mounting sub-frame assembly for connection to the frame of a crawler tractor, a pair of spaced supports adapted to extend longitudinally of the tractor frame, means adjacent one end of each of said supports for connecting said supports to the tractor axles, a lateral rigid connecting member rigidly connected to said supports adjacent the ends of said supports opposite said axle connecting means, said lateral connecting member having its end portions extending outwardly beyond the connections with said spaced supports and overlying the tractor track frame, means for rigidly connecting said connecting member to the tractor frame and equipment attaching means carried by said spaced supports.

References Cited in the file of this patent

UNITED STATES PATENTS

| | | |
|---|---|---|
| 1,746,001 | Leake | Feb. 4, 1930 |
| 2,073,823 | Anthony | Mar. 16, 1937 |
| 2,495,143 | Simmonds | Jan. 17, 1950 |
| 2,690,848 | Beyerstedt | Oct. 5, 1954 |
| 2,741,377 | Gauthier | Apr. 10, 1956 |